United States Patent
Hattori et al.

(10) Patent No.: US 9,965,519 B2
(45) Date of Patent: May 8, 2018

(54) DOCUMENT LINKAGE AND FORWARDING

(71) Applicant: Passport Health Communications, Inc., Franklin, TN (US)

(72) Inventors: Robert Hattori, Davis, CA (US); Julio Perez, Sacramento, CA (US); Jerrold Scott Stubblefield, Carmichael, CA (US)

(73) Assignee: PASSPORT HEALTH COMMUNICATIONS, INC., Franklin, TN (US)

(*) Notice: Subject to any disclaimer, the term of this patent is extended or adjusted under 35 U.S.C. 154(b) by 310 days.

(21) Appl. No.: 14/959,322

(22) Filed: Dec. 4, 2015

(65) Prior Publication Data
US 2017/0147650 A1    May 25, 2017

Related U.S. Application Data

(60) Provisional application No. 62/260,093, filed on Nov. 25, 2015.

(51) Int. Cl.
| | | |
|---|---|---|
| G06F 17/00 | (2006.01) | |
| G06F 17/30 | (2006.01) | |
| H04L 29/08 | (2006.01) | |
| G06F 17/22 | (2006.01) | |

(52) U.S. Cl.
CPC .... G06F 17/30507 (2013.01); G06F 17/2235 (2013.01); G06F 17/30011 (2013.01); G06F 17/30477 (2013.01); G06F 17/30722 (2013.01); G06F 17/30958 (2013.01); H04L 67/02 (2013.01); H04L 67/20 (2013.01)

(58) Field of Classification Search
CPC ......... G06F 17/30507; G06F 17/30867; G06F 17/30554; G06F 17/30864; G06F 17/30528; G06F 17/30696; G06F 17/30011; G06F 17/04842; G06F 17/30268
USPC ......................... 707/694, 706, 722, 999.001
See application file for complete search history.

(56) References Cited

U.S. PATENT DOCUMENTS

| | | | | |
|---|---|---|---|---|
| 8,929,640 | B1* | 1/2015 | Mennie | G06K 9/00469 |
| | | | | 382/135 |
| 2004/0093317 | A1* | 5/2004 | Swan | H04M 3/42365 |
| 2005/0192920 | A1* | 9/2005 | Hodge | G06F 17/30014 |
| 2006/0253418 | A1* | 11/2006 | Charnock | G06F 17/30716 |
| 2008/0120129 | A1* | 5/2008 | Seubert | G06Q 10/06 |
| | | | | 705/35 |

(Continued)

*Primary Examiner* — Dung K Chau
(74) *Attorney, Agent, or Firm* — Merchant & Gould

(57) ABSTRACT

Keeping track of which communications are related, or linked, in a series of communications is an important feature in many electronic document systems. As communication chains grow and branch, however, these systems require meticulous use of unique document identifiers to maintain those links. Systems and methods to create or restore these links in the absence or misuse of unique document identifiers are therefore provided. Responsive communications from parties are linked with the initial communications whose requests are answered by the responsive communications. Additionally, any requests not answered by the responsive communications may be automatically configured into a secondary communication which will be linked with the responsive communication and the initial communication so that its responsive communication may be built into the chain of communication.

20 Claims, 8 Drawing Sheets

(56) References Cited

U.S. PATENT DOCUMENTS

| | | | |
|---|---|---|---|
| 2009/0172035 A1* | 7/2009 | Lessing | G06F 17/30595 |
| 2011/0179053 A1* | 7/2011 | Pandolfi | G06F 17/30011 |
| | | | 707/758 |
| 2014/0136504 A1* | 5/2014 | Shum | G06F 17/30864 |
| | | | 707/706 |
| 2014/0172832 A1* | 6/2014 | Rollins | G06F 17/30253 |
| | | | 707/722 |

* cited by examiner

```
ST*837*0021*005010X222A1~
BHT*0019*00*0123*20150528*1023*CH~
NM1*41*2*ACME BILLING SERVICE*****46*TGJ23~
PER*IC*WILEY*TE*3055552222~
NM1*40*2*ABC RECEIVER*****46*66783JJT~
HL*1**20*1~
NM1*85*1*HACKENBUSH*HUGO****XX*1999996666~
N3*1234 OAK ST~
N4*ANYTOWN*FL*33111~
REF*EI*123456789~
PER*IC*TONY*TE*3055551234~
NM1*87*2~
N3*2345 ELM BLVD~
N4*SOMETOWN*FL*33112~
HL*2*1*22*1~
SBR*P*******CI~
NM1*IL*1*UPJOHN*EMILY****MI*111223333~
DMG*D8*19730501*F~
NM1*PR*2*SPARKLING LAKE INSURANCE COMPANY*****PI*999996666~
N3*3456 ASH AVE~
N4*THE CITY *FL*33000~
REF*G2*PBS3334~
HL*3*2*23*0~
PAT*19~
NM1*QC*1*UPJOHN*EMILY~
N3*4567 PINE CIRC~
N4*ANYTOWN*FL*33111~
DMG*D8*19730501*F~
CLM*26407789*800***11:B:1*Y*A*Y*I*P~
DTP*434
HI*BK:4779*BF:2724*BF:2780*BF:53081~
NM1*82*1*HACKENBUSH*HUGO****XX*1999996666~
PRV*PE*PXC*204C00000X~
REF*G2*KA6663~
NM1*77*2*STANDISH SANITARIUM*****XX*1581234567~
N3*2345 ELM BLVD~
N4*SOMETOWN*FL*33112~
SBR*S*01*******CI~
OI***Y*P**Y~
NM1*IL*1*UPJOHN*EMILY****MI*T55TY666~
N3*4567 PINE CIRC~
N4*ANYTOWN*FL*33111~
NM1*PR*2*KEY INSURANCE COMPANY*****PI*999996666~
LX*1~
SV1*HC:99213*400*UN*1***1:2:3:4~
DTP*472*D8*20150527~
LX*2~
SV1*HC:90782*200*UN*1***1:2~
DTP*472*D8*20150527~
LX*3~
SV1*HC:J3301*200*UN*1***1:2~
DTP*472*D8*20150527~
SE*52*0021~
```

Fig. 1A

DOCUMENT LINKAGE AND FORWARDING

RELATED APPLICATIONS

This application claims priority from U.S. Provisional Patent Application No. 62/260,093 titled, "DOCUMENT LINKAGE AND FORWARDING" and having a filing date of Nov. 25, 2015, which is incorporated herein by reference.

BACKGROUND

When multiple parties communicate amongst themselves, they need a way to determine what the subject of their communication is and determine who is communicating with whom. When communications take place via structured documents (e.g., forms, databases), these determinations are aided by using unique identifiers (UID) for various subjects within the structured documents. For example, a social security number, a student identification number, or an account number are commonly used to identify subjects in structured documents regarding persons. However, parties may use distinct UIDs from one another, reuse UIDs differently than other parties, or introduce clerical errors into the use of UIDs. The inconsistent use of UIDs between parties makes linking related documents kept by different parties challenging. Although standards for structured documents help identify related documents, as more parties become involved in a series of communications, the challenges in making links between those documents grows exponentially with inconsistent UID use. This challenge is especially prominent as communications branch and parties involved in the communications do not directly address one another, but increasingly rely on automated systems to process structured electronic documents that comprise the communications.

BRIEF SUMMARY

The present disclosure provides systems and methods for linking and examining electronic documents for further automatic processing. As used herein, request documents are created by a first party to set forth several fields of data related to a given subject matter that a second party is directed to address. The second party responds to the request document with a response document. The response document concerns the same subject matter, but may not fully address the data fields in the request document or use the same identifiers for various parties identified in the request document. For example, a doctor's office may submit a request document outlining several procedures which an insurance provider is requested to cover. The insurance provider will then submit a response document outlining how it has decided to cover the outlined procedures.

When the response document does not fully address specified data fields in the request document, a secondary request document may be automatically generated and sent to a third party for a further response. For example, when a request document is sent to a high school to request a student's grades, but the response document from the high school only returns grades for the student's junior and senior years, a secondary request document may be automatically generated and sent to a different high school requesting the student's grades from freshman and sophomore years.

To track how a request document has been responded to, and whether a secondary request document needs to be generated, the request document and the response document must first be linked. However, the parties may use different identifiers for the subjects of the documents or use the same identifier in multiple request documents or response documents, which makes defining a one-to-one match of request to response based on the identifiers impossible. For example, the patent office may refer to an application and its file history with the number "99/123,456" and an applicant refers to it as "12345.0001US01", and if either party used their number to refer to a second application or there were no document in the chain of requests and responses that uses both numbers, there would be no way to determine which application is being referred to by using identifiers alone. Therefore, various rules are applied to selected data fields in the request document and the response document to determine which documents should be linked as a best match to the other.

For a request document to qualify as the best match to the response document, various rules of construction must be met for the two documents. These rules are configured according to the structure of the documents to be compared, and specify various fields in the documents that must match for the request to be determined to match the response. As will be understood, the rules may be configured to account for missing or non-identical data and to weight some matching fields more heavily than others when determining whether a given request is the best match to the response. For example, when a response document is compared to first and second request documents, and each request document has one (different) field not matching a corresponding field from the response, the rules may be configured that the first request document is determined to best match the response document, the second request document is determined to best match the response document, or neither request document is determined to match the response document.

Once a best match has been determined between the response document and the request documents, the link is stored in a database and any data fields that were not fully responded to are used to generate a secondary request document. This process may be repeated until all the data fields are fully responded to or until no further parties to which secondary request documents may be sent are available.

The systems and methods provided in the present disclosure overcome problems inherent to electronic systems by reducing the amount of data and number of communications transmitted between parties to answer a request document. In various aspects, the processing resources that are expended to create a secondary request document are also reduced because the processes that link documents may double to adjust which data fields, and their associated values, are sent in a secondary request document.

Aspects of systems and methods described herein may be practiced in hardware implementations, software implementations, and in combined hardware/software implementation. This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention. In the drawings:

FIG. 1A is an example request document;

DETAILED DESCRIPTION

Figure 1B:
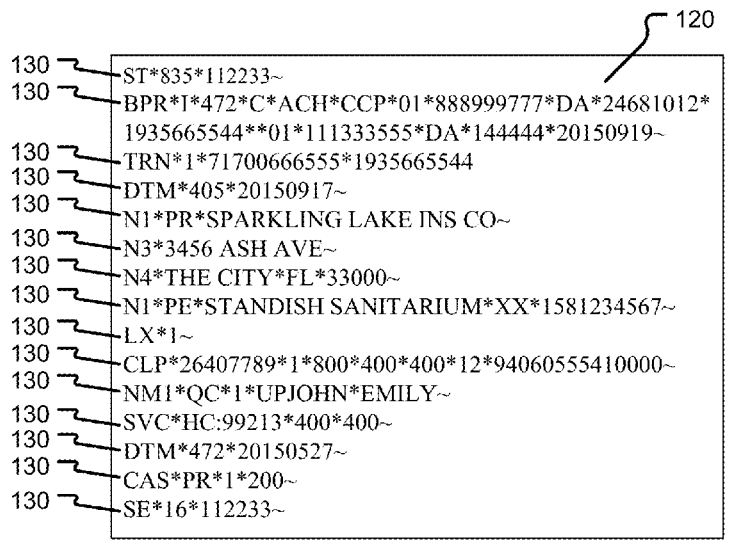
FIG. 1B is an example response document.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The present disclosure provides systems and methods for linking and examining electronic documents for further automatic processing. As used herein, request documents are created by a first party to set forth several fields of data related to a given subject matter that a second party is directed to address. The second party responds to the request document with a response document. The response document concerns the same subject matter, but may not fully address the data fields in the request document or use the same identifiers for various parties identified in the request document. For example, a doctor's office may submit a request document outlining several procedures which an insurance provider is requested to cover. The insurance provider will then submit a response document outlining how it has decided to cover the outlined procedures.

When the response document does not fully address specified data fields in the request document, a secondary request document may be automatically generated and sent to a third party for a further response. For example, when a request document is sent to a high school to request a student's grades, but the response document from the high school only returns grades for the student's junior and senior years, a secondary request document may be automatically generated and sent to a different high school requesting the student's grades from freshman and sophomore years.

To track how a request document has been responded to, and whether a secondary request document needs to be generated, the request document and the response document must first be linked. However, the parties may use different identifiers for the subjects of the documents or use the same identifier in multiple request documents or response documents, which makes defining a one-to-one match of request to response based on the identifiers impossible. For example, the patent office may refer to an application and its file history with the number "99/123,456" and an applicant refers to it as "12345.0001US01", and if either party used their number to refer to a second application or there were no document in the chain of requests and responses that uses both numbers, there would be no way to determine which application is being referred to by using identifiers alone. Therefore, various rules are applied to selected data fields in the request document and the response document to determine which documents should be linked as a best match to the other.

For a request document to qualify as the best match to the response document, various rules of construction must be met for the two documents. These rules are configured according to the structure of the documents to be compared, and specify various fields in the documents that must match for the request to be determined to match the response. As will be understood, the rules may be configured to account for missing or non-identical data and to weight some matching fields more heavily than others when determining whether a given request is the best match to the response. For example, when a response document is compared to first and second request documents, and each request document has one (different) field not matching a corresponding field from the response, the rules may be configured that the first request document is determined to best match the remit, the second request document is determined to best match the target, or neither request document is determined to match the response document.

Once a best match has been determined between the response document and the request documents, the link is stored in a database and any data fields that were not fully responded to are used to generate a secondary request document. This process may be repeated until all the data fields are fully responded to or until no further parties to which secondary request documents may be sent are available.

Examples of numbers in the present disclosure are given in base ten unless noted otherwise. When a different base is used, a subscript beginning with the character "x" and the base value will follow the number. For example, the number ten may be designated as 10, $A_{x16}$, or $1010_{x2}$ for decimal, hexadecimal, and binary examples respectively. Additionally, for numbers given in binary formats, numbers will be presented in groups of four with spaces between each group. For example, the number one is presented as $0001_{x2}$ and the number seventeen is presented as $0001 0001_{x2}$. When individual values for bits are discussed, they may be represented as "one/TRUE" or "zero/FALSE" to distinguish these values within the text. One of ordinary skill in the art will be able to read and understand these values within the context that they are given in the present disclosure.

The systems and methods provided in the present disclosure overcome problems inherent to electronic systems by reducing the amount of data and number of communications transmitted between parties to answer a request document. In various aspects, the processing resources that are expended to create a secondary request document are also reduced because the processes that link documents may double to adjust which data fields, and their associated values, are sent in a secondary request document.

Figure 1C:
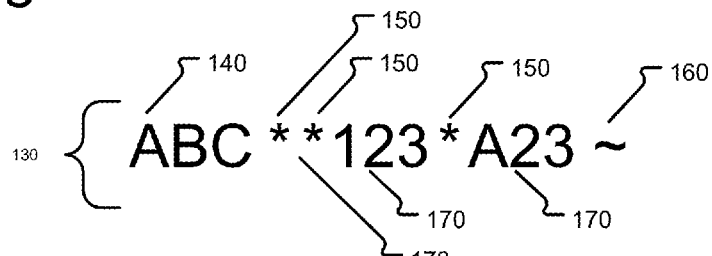
FIGS. 1C and 1D are a first and second example format of a data segment.
Figure 1D:
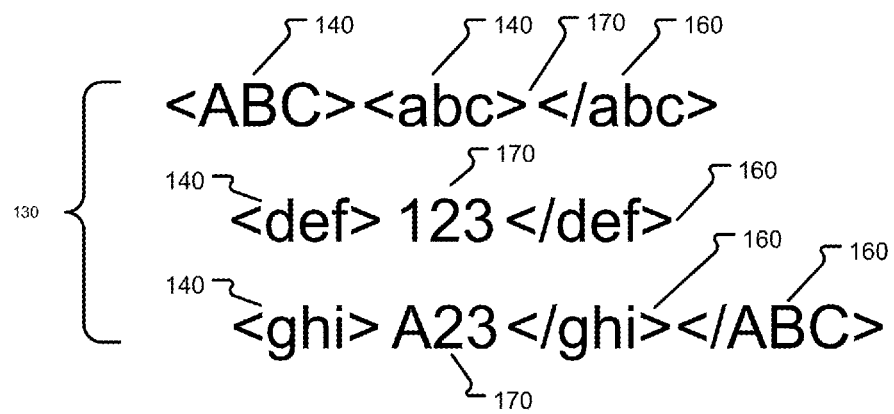

FIGS. 1A and 1B illustrate example document layouts for a request document 110 and a response document 120, respectively. FIGS. 1C and 1D illustrate example formats for a data segment 130 that comprises a part of a request document 110 or a response document 120. The structure of the example documents are illustrated according to the Accredited Standards Committee X12 format (X12), such as the X12-835 and X12-837 standards, but one of skill in the art will recognize that documents may be structured according to various other electronic data interchange standards, such as, for example, Health Level-7 (HL7), United Nations/ Electronic Data Interchange for Administration Commerce and Transport (UN/EDIFACT), etc., or various internal standards set by one or more of the communicating parties using the eXtensible Markup Language (XML), JavaScript Object Notation (JSON), or another method of providing a schema to an electronic document. The individual characters within an electronic document may be encoded via various character encoding formats, including, but not limited to, the Unicode Transformation Formats (UTF) such as, UTF-8, or UTF-32, the American Standard Code for Information Interchange (ASCII) format, ISO/IEC 8859, and other character encoding schemes known to those of ordinary skill in the art.

FIG. 1A is an example request document 110. A request document 110 lays out in a structured format the various data that are needed for a first party to request a response from a second party. In the illustrated example, several medical procedures for which a party is seeking reimbursement are included in a request document 110 that includes data to request reimbursement from an insurance provider, such as, patient data, procedure data, and billing data, which are structured via data segments 130 (discussed in greater detail in regard to FIGS. 1C and 1D). In another example, a request document 110 may be a request from a first educational institution to a second educational institution for student records, which would include data to identify given students, what type of records are being sought, and time periods from which records are sought. In yet another example, a request document 110 may be a request for inventory replenishment that identifies types, quantities, and delivery dates for desired inventory and seeks confirmation of terms. As will be understood, request documents 110 may be used in several industries to fill several purposes and will be structured according to the needs of those industries.

FIG. 1B is an example response document 120. A response document 120 lays out in a structured format the various data that are needed for a requesting party, who sent a request document 110, to know how its requests have been answered by a second party. Similar to a request document 110, the data of a response document 120 is organized via data segments 130 (discussed in greater detail in regard to FIGS. 1C and 1D). Because the response document 120 is related to a request document 110, the illustrated example in FIG. 1B shows a payment response from a payer for the requested reimbursement of the example request document 110 of FIG. 1A. If, however, the example request document 110 in FIG. 1A were for requesting student records, as in the second example given in regard to FIG. 1A, the response document 120 would contain data related to the second educational institution's perspective on the student records requested. Similarly, following the third example given in regard to FIG. 1A, if the request document 110 held inventory replenishment data, the response document 120 would be from the supplier's perspective on its ability to meet the inventory replenishment request.

As will be understood, the various parties using structured documents to communicate amongst each other may use different identifiers for various subjects, or may not be able to fully address or answer a requesting party's request. Following the inventory replenishment example, if the requesting party has asked for five-hundred widgets, the request document 110 will include a line item asking for five-hundred widgets. If the supplier does not have five-hundred widgets, the response document 120 may include a line item indicating that delivery cannot be accomplished, or to what extent delivery will be achieved (e.g., five-hundred as requested, two-hundred supplied with a difference of three-hundred). Regardless of whether the supplier can or cannot fill the order as requested, the supplier may use an internal identifier to refer to the widget (e.g., "wid-101") that this different than the requester's identifier for the same widget (e.g., "WDT-101"). Therefore, the response document 120 may contain different data than the request document 110 to which it responds, even when dealing with the same subject, and those data may only partially respond to the requests in the request document 110.

In the illustrated example, the response document 120 includes data related to the subject matter of the request document 110 illustrated in FIG. 1A, but from a different party's perspective. Some of the data are identical, such as, for example, the data segment 130 of "NM1*QC*1*UPJOHN*EMILY-", but some of the data are related, but not identical. For example, the three data segments 130 for individual procedures in the request document 110 request $800 in total, while the response document 120 identifies that only half that will be reimbursed; covering one procedure in full and not including information on the other two procedures or the payment thereof; leaving them unanswered.

FIG. 1C is a first example format and FIG. 1D is a second example format of a data segment 130, which may comprise a portion of a structured document, such as a request document 110 or a response document 120. A structured document is comprised of several data segments 130 which provide context to the data held by the document via positioning data in a known manner, labeling the data, and combinations thereof.

The data segment 130 begins with a segment identifier 140, which is a set of characters used, according to the standard of the structured document, to identify the subject of the data segment 130, and the data segment 130 ends with a segment terminator 160. In various aspects, such as illustrated in FIG. 1C, a segment terminator 160 may be a character or set of characters used to designate that subsequent characters are to be interpreted as a new segment identifier 140. In other aspects, such as illustrated in FIG. 1D, a segment terminator 160 indicates the end of the data identified as part of a given data segment 130 identified by a particular segment identifier 140. For example, under X12-835, a segment identifier 140 of "NM1" indicates that the data segment 130 relates to name information for a party, while a segment identifier 140 of "DTM" indicates that the data segment 130 relates to date and time information. The position of a data segment 130 within the structured document relative to other data segments 130 is used to provide further identification to the subject of the data segment 130. For example, the first instance of the "NM1" segment identifier 140 within a structured document may be interpreted as name information for the party submitting the structured document, while the second instance may be interpreted as name information for the party designated to receive the structured document. In another example format, such as in XML, segment identifiers 140 such as "<name>" may be paired with a segment terminator 160 of "</name>" to include all enclosed data as being related to name information.

Within a data segment 130, data fields 170 may be defined to further structure the data via delineators 150 or by nesting segment identifiers 140 and segment terminators 160. A delineator 150 may be a specially designated character or set of characters used to set off one data field 170 from another. In various aspects, such as under X12-835, the order of data fields 170 or nested segments within a data segment 130 provide further detail about the data held in a data field 170, and data fields 170 without any data therein are presented to preserve an order of data fields 170 within the data segment 130. For example, in a data segment 130 (defined by a segment identifier 140 of "NM1") for name data, a first data field 170 may be reserved for an entity type qualifier (e.g., person, animal, corporation) and a second data field 170 may be reserved for the name of the entity, and whatever data appears in the first data field 170 would be attempted to be interpreted as the entity type qualifier.

Figure 2:
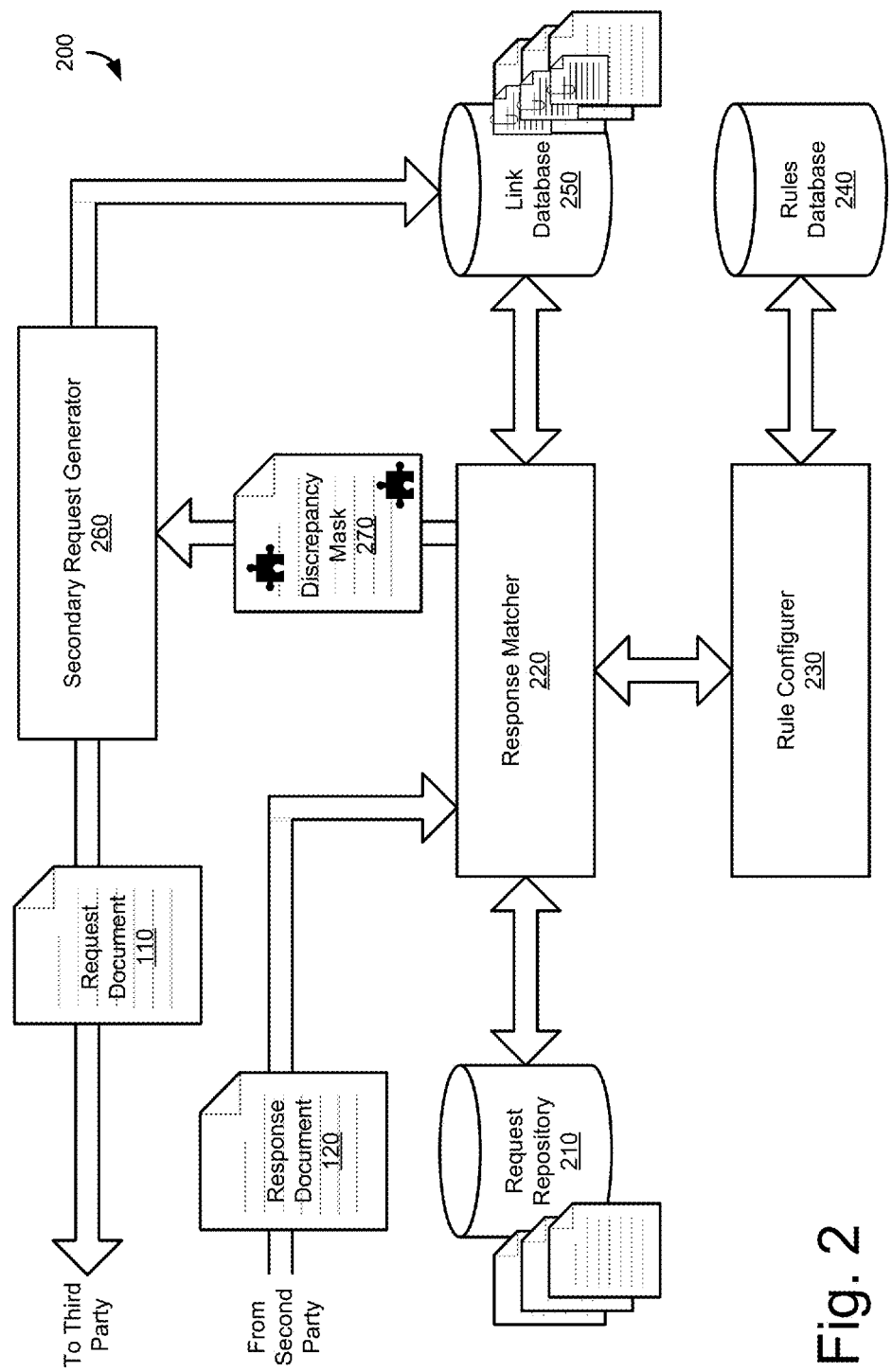
FIG. 2 is a block diagram illustrating components of an example document linking system.

FIG. 2 is a block diagram illustrating components of an example document linking system 200. The document linking system 200 is operable to receive a response document 120 and determine which request document 110, if any, is the best match for the response document 120, and link those documents for further processing. However, because not every best match is an exact match, the rules used by the response matcher 220 to determine which of the structured documents are the best match serve a double purpose in generating a discrepancy mask 270, which is used by a secondary request generator 260 to produce a secondary request document 110 that is transmitted to a third party, so that data missing from an initial response document 120 can be addressed via a subsequent response document 120. For example, when a response document 120 includes two semesters of grades for a student from a first educational institution, but the best matching request document 110 requested four semesters of grades, a discrepancy mask 270 is generated during the matching process, which is used to generate a secondary request document 110 that will be sent to a second educational institution to request the missing two semesters worth of grades without having to repeat a request for the two semesters of grades that have already been received.

When an initial request document 110 is generated, it is transmitted to a receiving party (the second party), so that the sending party's (the first party) requests in the request document 110 maybe responded to. The initial request document 110 is stored in a request repository 210 so that when a response document 120 is received, the two structured documents may be matched. Any subsequent request documents 110 will also be stored in the request repository 210. In various aspects, response documents 120 may also be stored in the request repository 210 or in a separate response repository (not illustrated).

When a response document 120 is received, a response matcher 220 will attempt to find the best matching request document 110 that is stored in the request repository 210 to which to link the response document 120. In various aspects, the request repository 210 is a remote server or local device including computer-readable storage media (e.g., a hard drive) that is accessible by the response matcher 220. All of the structured documents that the response matcher 220 handles are identified by unique document identifiers that are assigned by the document linking system 200 upon their receipt. The unique document identifier may be assigned sequentially to structured documents as they are received or may include party identifiers so that structured documents are given separate assignment queues for unique document identifiers for each party communicating via the document linking system 200. The unique document identifiers are used in conjunction with the link database 250 as key values for the document linking system 200 to track chains of communication that involve the structured documents.

To determine whether a given request document 110 of the plurality of request documents 110 stored in the request repository 210 qualifies as a match (best or otherwise) for a response document 120, the response matcher 220 communicates with a rules configurer 230 to retrieve, from a rules database 240, a configuration of rules by which the response document 120 is compared to the request documents 110. The rules determine whether given data fields 170 in the structured documents of the request documents 110 and response documents 120 are present, and if the contents of those fields match or differ. The configuration of the rules serve to weight the results of the rules, acting to enable, disable, and vary the impact of a rule on determining which request document 110 is the best match to the response document 120. In various aspects, weight is not assigned via a score for a given rule or configuration, but by running configurations (i.e., groups) of rules in a specified ordered so that the first set of structured documents that pass the group's rules are considered the best match, and when a best match is not found for a given group of rules, proceeding to the next group of rules until a best match is found or all groups have been tried. Various rules, and configurations thereof, are discussed in greater detail in regards to FIGS. 6A-C.

The configuration is set for a given request document 110 by the party who submitted that request document 110, and a party may set several such configurations, and an order in which they will be applied to request documents 110 that the requesting party submitted that the response matcher 220 is comparing to the response document 120. The requesting party, via a configuration, states its preferences for which data segments 130 or data fields 170 will be selected from a response document 120 to be compared with equivalent data segments 130 and data fields 170 in its request documents 110. Because the communications use structured documents, the context of a given data segment 130 will be known, and the response matcher 220 may automatically select which data segments 130 and data fields 170 are equivalent between request documents 110 and response documents 120.

Once the response matcher 220 has retrieved the rules configuration from the rules database 240, the response document 120 is compared to all of the request documents 110 stored in the request repository 210. In various aspects, all available rules are run for each of the pairings of a given request document 110 and the response document 120, and a series of configurations are applied to the structured documents until a best matching request document 110 is found or the series of configurations has been exhausted. Each configuration selects one or more rules from the rules database 240 which will affect its outcome. For example, a first configuration may set that a rule for a number of line items on a billing-request request document 110 must match a number of lines items on a billing acknowledgement response document 110 and a rule that the amounts of those line items match, while a second configuration may set that a rule for a date of transaction and a shipping number match. A plurality of request documents 110 may be checked according to the first configuration, and if no request documents 110 meet all the rules of the configuration, the next configuration is run against the available request documents 110 until a request document 110 satisfies the configuration, at which time it is set as the best match to the response document 120. In various aspects, when more than one request document 110 satisfies the configuration, such as when a requesting party accidentally sent a request document 110 twice, the multiple request documents 110 that satisfy a first configuration will be checked via the subsequent configurations until only one request document 110 satisfies a configuration, or both request documents 110 will use the response document 120 as their best match until one request document 110 is deleted from the request repository 210.

Senders of request documents 110 set which rules are grouped together as a configuration for attempting to match their request documents 110 to a response document 120 and set the order in which configurations are to be run. A configuration is a selection of one or more rules that a request document 110 must pass to be considered the best match for a given response document 120. A party may set several such configurations to be considered in sequence, for example, if all the rules comprising a first configuration are not passed, a second configuration will be considered, then a third, etc., until a configuration is satisfied or no further configurations exist. A given rule may be used in multiple configurations and a rule need not be included in any of a set of configurations to be run, although in some aspects, when a rule is not included in any of the configurations it may be not run.

When a request document 110 is determined to be the best match, the unique identifier for the request document 110 is stored in conjunction with the unique identifier for the response document 120 in the link database 250. In various aspects, the link database 250 may be a relational database management system running on a designated server that a user may access via queries (e.g., according to the Structured Query Language (SQL)). In other aspects, a document viewing application may automatically access the link database 250 when a user views a structured document so that a hyperlink is generated in the viewer so that any related structured electronic documents may be displayed to the user when the hyperlink is selected. For example, a user viewing a response document 120 may be provided hyperlinks to view the initial request document 110 to which the response document 120 responds to, a subsequent request document 110 based on the initial request document 110 and the response document 120, or another structured document in the chain of communication.

When multiple related structured documents form a chain of communications that span several responses or subsequent requests, the link database 250 is operable to associate each of the structured documents that form the chain. For example, an initial request document 110 may be partially responded to in a first response document 120, and a second request document 110 is generated to elicit a response related to the missing information from the first response document 120, which may be responded to via a second response document 120 (from the first responder or a third party). Each of the structured documents in a chain of communications may be linked to the others within the link database 250 for later retrieval by a user and further use by the document linking system 200.

Secondary request documents 110 may be generated automatically by the document linking system 200 when a response document 120 does not fully answer the best matching request document 110. When the response matcher 220 runs the rules to determine the request document 110 that best matches a given response document 120, there may be some rules that still fail that were not part of the configuration used to identify the structured documents as a best match for each other. For example, when requesting student records, the best matches may pass a configuration including rules for student name, educational institution names, social security number, etc., but lack records for some years of the student's education, for example, when the student transferred out of the educational institution that was contacted. Similarly, in other examples, a best match for a payment request may only partially cover the requested amount of payment, or an inventory replenishment response may offer substitute goods or a lesser amount of the requested goods to partially fill an order. These rule failures are used by the response matcher 220 to generate a discrepancy mask 270 when the preferences of a party allow for automatic secondary request document 110 generation.

In some aspects, a discrepancy mask 270 is constructed from the data segments 130 of a best matching request document 110 related to the parties communicating (or to be communicated with) and data segments 130 that are not present in, or do not match the data segments 130 in, the response document 120 to generate an additive-discrepancy mask 270. In other aspects, the discrepancy mask 270 is constructed from the data segments 130 of the best matching request document 110 that are matched in an equivalent data segment 130 of the response document 120 to generate a subtractive-discrepancy mask 270. Similarly, individual selected data fields 170 may be included in the discrepancy mask 270. In addition to data segments 130 in which the rules have found a discrepancy or a match between the best matching structured documents, the discrepancy mask 270 may include data segments 130 not checked by the rules that are used to provide information required by the standard that defines a request document 110. For example, under X12-837, a request document 110 requires information on a submitting party's agent to contact, which may not be checked by any rules, but will be included from the initial request document 110 in the discrepancy mask 270. Similarly, any data fields 170 that are required by a standard to construct a data segment 130 that will be included in the discrepancy mask 270 will also be included.

In various aspects, the discrepancy mask 270 also includes the differences between data fields 170. For example, when a data field 170 in the request document 110 specifies that one-hundred widgets were requested, but a data field 170 in the response document 120 specifies that seventy widgets will be provided, a difference of thirty widgets may be reported in the discrepancy mask 270.

To reduce the processing resources consumed by the document linking system 200, the discrepancy mask 270 is generated concurrently while the rules are run to find the best match for a given response document 120. In various aspects, the best matching request document 110 is the request document 110 that results in the smallest number of data segments 130 in an adaptive-discrepancy mask 270 or the largest number of data segments 130 in a subtractive-discrepancy mask 270 for a given configuration.

The discrepancy mask 270 is transmitted to a secondary request generator 260, which uses the discrepancy mask 270 to automatically generate a new, secondary request document 110 to pose requests that were not fully answered by the response document 120. In various aspects, an initial request document 110 is sent from the first party to the second party, who sent the response document 120, and the secondary request document 110 is sent to a third party who is identified in the initial request document 110 or the response document 120 as a potential party. For example, an initial request document 110 from a first educational institution to a second educational institution requesting student records may identify a third educational institution, from which the student transferred to the second educational institution.

Rather than transmitting the initial request document 110 twice (at the same time to multiple parties or after a response document 120 is received), a secondary request document 110 is generated and transmitted to include requests that were not satisfied by the previous response document 120. A secondary request document 110 therefore contains less data than the initial request document 110, and a document linking system 200 that produces secondary request documents 110 reduces the bandwidth needed to communicate via structured documents. The first party may refrain from sending request documents 110 to multiple identified parties to, for example: reduce bandwidth used by the system (e.g., when the second party is expected to have the data that the third party can provide), give preference to a given party (e.g., let a preferred supplier attempt to fill an order first), follow a chain of responsibility (e.g., a primary insurance provider is requested for reimbursement before a secondary provider), or increase the speed of the system (e.g., selecting a party expected to respond faster or more reliably to a request document 110).

In aspects using additive-discrepancy masks 270, the secondary request generator 260 formats the data received in the discrepancy mask 270 according to a standard that the third party is operable to receive into a secondary request document 110, which is transmitted to the third party to affect a response document 120. In aspects using subtractive-discrepancy masks 270, the secondary request generator 260 compares the best matching request document 110 to the discrepancy mask 270 to remove data segments 130 from the best matching request document 110, which converts the best matching request document 110 into a secondary request document 110 having none of the data segments 130 or data fields 170 that were already responded to by the response document 120 according to the configuration.

In various aspects, the secondary request document 110 is a new structured document that will be stored as a request document 110 in the request repository 210 when it is transmitted. In these aspects, the secondary request generator 260 will link, in the link database 250, the secondary request document 110 with the response document 120 that necessitated its generation, and thereby link the secondary request document 110 to the initial request document 110. In other aspects, to reduce the memory needed to store request documents 110, the secondary request document 110 will not be stored in the request repository 210 or given a new unique document identifier, and any responses to the secondary request document 110 will be linked to the initial request document 110 by the document linking system 200.

Figure 3:
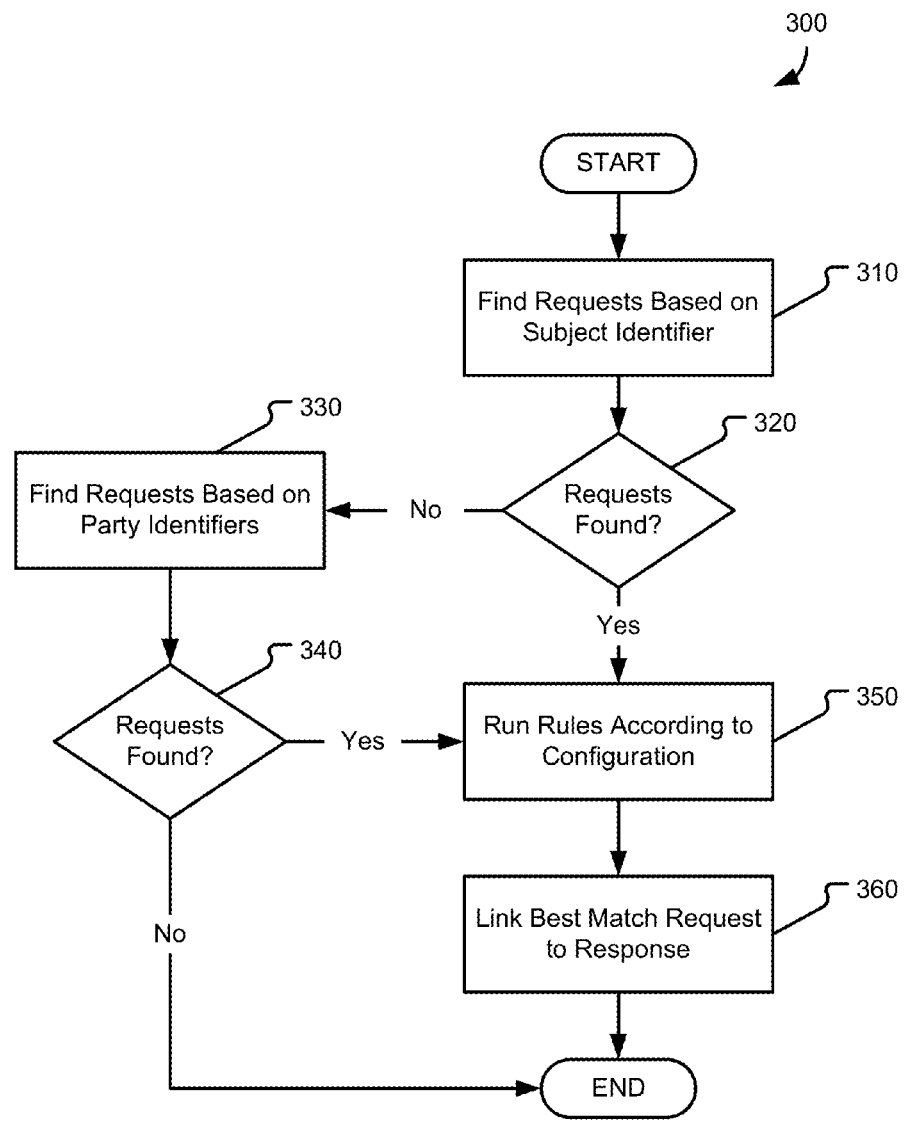
FIG. 3 is a flow chart showing general stages involved in an example method for linking structured documents.

FIG. 3 is a flow chart showing general stages involved in an example method 300 for linking structured documents. Method 300 begins at OPERATION 310, where request documents 110 are searched for in a request repository 210 based on a subject's identifier that is present in the response document 120. In various examples, an identifier for a subject may be an encounter number for a doctor's office visit, a student ID number for requesting student records, or a part number for placing a replenishment order. Method 300 proceeds to DECISION OPERATION 320 where it is determined whether any request documents 110 were found that match the response document 120 based on a subject identifier. Subject identifiers are parsed from data segments 130 of the structured documents that include names or identification numbers (e.g., social security number, tax identification number, part numbers) of the subjects, order numbers, procedure descriptions, etc., and are compared across documents. The subject identifiers may be exact matches or approximate matches (e.g., substituting known abbreviations within a name, accounting for typographical errors) in various aspects. If request documents 110 were found, method 300 proceeds to OPERATION 350, while if no request documents 110 were found, method 300 proceeds to OPERATION 330.

At OPERATION 330, request documents 110 are searched for in a request repository 210 based on party identifiers present in the response document 120. Party identifiers may be parsed from data segments 130 that include name or contact (e.g., email, phone address) information for the sending or receiving parties of a structured document or payment routing information (e.g., bank accounts of the parties, a clearing house's identifier for a party), which may be exact or approximate matches (e.g., substituting known abbreviations within a name, accounting for typographical errors) in various aspects.

Because the responding party may use different identifiers for the subject of a communication than the party who sent the request document 110, or not include an identifier used by the other party, OPERATION 330 serves to ensure that if a matching request document 110 exists, it will be found. In various aspects, the number of request documents 110 that are expected to return in a search based on party identifier is expected to be greater than the number of request documents 110 that would be returned in a search based on subject identifier, and OPERATION 330 will therefore be performed in the event that OPERATION 310 does not return results; broadening the potential number of matches. In other aspects, where the opposite may be true for relative numbers of request documents 110 expected to be returned in a search, the order in which OPERATION 310 and OPERATION 330 are executed relative to one another may be reversed. For example, a doctor's office may frequently communicate with an insurance provider regarding many encounters, and checking for request documents 110 based on a specific encounter may provide fewer request documents 110 to match against than if the request documents 110 were searched for based on the parties. In contrast, an educational institution may have several request documents 110 that relate to a given student and therefore use that student's identifier, but relatively few that deal with a given receiving party, and therefore running OPERATION 330 prior to (potentially) running OPERATION 310 will improve the efficiency of finding matching request documents 110 by reducing the number of structured documents that will need to be examined.

From OPERATION 330, method 300 proceeds to DECISION OPERATION 340, where it is determined whether any request documents 110 were found that match the response document 120 based on a party identifier. If request documents 110 were found, method 300 proceeds to OPERATION 350, while if no request documents 110 were found, method 300 concludes for the given response document 120.

At OPERATION 350, various rules are run against the response document 120 and the request documents 110 that were found in OPERATION 310 or OPERATION 330 according to the rule configuration set by the requesting party. Individual rules are discussed in greater detail in FIGS. 6A-C, but, in general, various data fields 170 are selected in the request documents 110 and the response document 120, parsed for their contents, and the contents are compared to one another to determine whether the data fields 170 match or are otherwise related. These contents are compared between the response document 120 and each of the request documents 110 that were found, and may result in determining that the request document 110 has a data field 170 that is null (i.e., is not present or contains no content) in the response document 120, the response document 120 has a data field 170 that is null in the request document 110, the request document 110 and the response document 120 have data fields 170 whose content matches, or the request document 110 and the response document 120 have data fields 170 whose contents do not match.

In various aspects, the data fields 170 are compared by arrays of logical gates (e.g., AND, OR, XOR, NOT, NAND, NOR, NXOR) for a bitwise comparison of the characters encoded in each of the data fields 170 compared. In other aspects, such as when a data field 170 is known to contain numeric characters, rather than alphabetic or alphanumeric characters, the contents of the data fields 170 are compared via one or more logical subtractor circuits, comprised of an arrangement of logical gates which one of ordinary skill in the art will be acquainted with, to produce the difference between the two data fields 170. In various aspects, the data fields 170 from the response document 120 may be subtracted from the request document 110 or vice versa. As will be understood, when the difference is zero, the contents of the two data fields 170 are considered to be matching. When a data field 170 is present in the request document 110, but not in the response document 120, or an amount indicated in the request document 110 exceeds that in the response document 120, the data field 170 or the difference may be included in an additive-discrepancy mask 270.

The rules that are used to determine which of the request documents 110 is the best match for the response document 120 are set up according to a configuration set by the party who generated the request document 110 (i.e., the requesting party). In alternative embodiments, the configurations may be set by the party who generated the response document 120, or a third party operating the document linking system 200. The configuration sets which rules are considered when determining whether a given request document 110 and response document 120 are best matches for each other, and a party may set the order in which configurations are to be considered. For example, a given party's first configuration may use a first rule and a second rule, a second configuration may use the second rule and a third rule, and a third configuration may use the first rule and a fourth rule. Because the request documents 110 to be analyzed are subject to OPERATION 310 or OPERATION 330 before being run through the configurations of rules, only one requesting party's configurations will be used in determining the best matches. The request document 110 that passes the rules of the earliest configuration in the sequence of configurations set by the requesting party to be compared to the response document 120 is considered the best match with the response document 120. If a given requesting party's configurations do not use a given rule (e.g., a hypothetical fifth rule for the configuration grouping example above), those rules may be run as part of generating a discrepancy mask 270, or may be not run, to reduce processing requirements for finding a best match.

Method 300 then proceeds to OPERATION 360, where the best matching request document 110 of those found in OPERATION 310 or OPERATION 330 is linked to the response document 120. In various aspects, a link database 250 is used to store a unique identifier for each structured document found to be within a chain of best matches so that the related structured documents can be easily analyzed for further processing. For example, an initial request document 110 that is determined to be the best match for an initial response document 120 will have its unique identifier stored in conjunction with the unique identifier of the initial response document 120, and when a secondary request document 110 is generated, its unique identifier will be stored in conjunction with both. Therefore, when a subsequent response document 120 for the secondary request document 110 identifies the secondary request document 110 as its best match, the subsequent response document 120 will be linked with the secondary request document 110 and have its unique identifier stored in conjunction with the initial request document 110, the initial response document 120, and the secondary request document 110; extending the chain of best matches from the initial request document 110 to all resultant response documents 120.

In aspects where the secondary response document 110 is not given a unique identifier, all response documents 120 determined to be the best match of an initial request document 110 will be stored in conjunction with each other and the initial request document 110, thus maintaining links for a chain of communication from a shared initial request.

After OPERATION 360 is run, resulting in a link being stored for a best match or a determination that no best match exists for the response document 120, method 300 concludes. When none of the configurations in OPERATION 350 were met by a request documents 110, method 300 concludes for the given response document 120 without linking a request document 110. In various aspects, instead of linking a best matching request document 110, a flag is linked with the given response document 120 in the link database 250 so that the response document 120 may attempt to be re-matched with a request document 110 at a later time.

Figure 4:
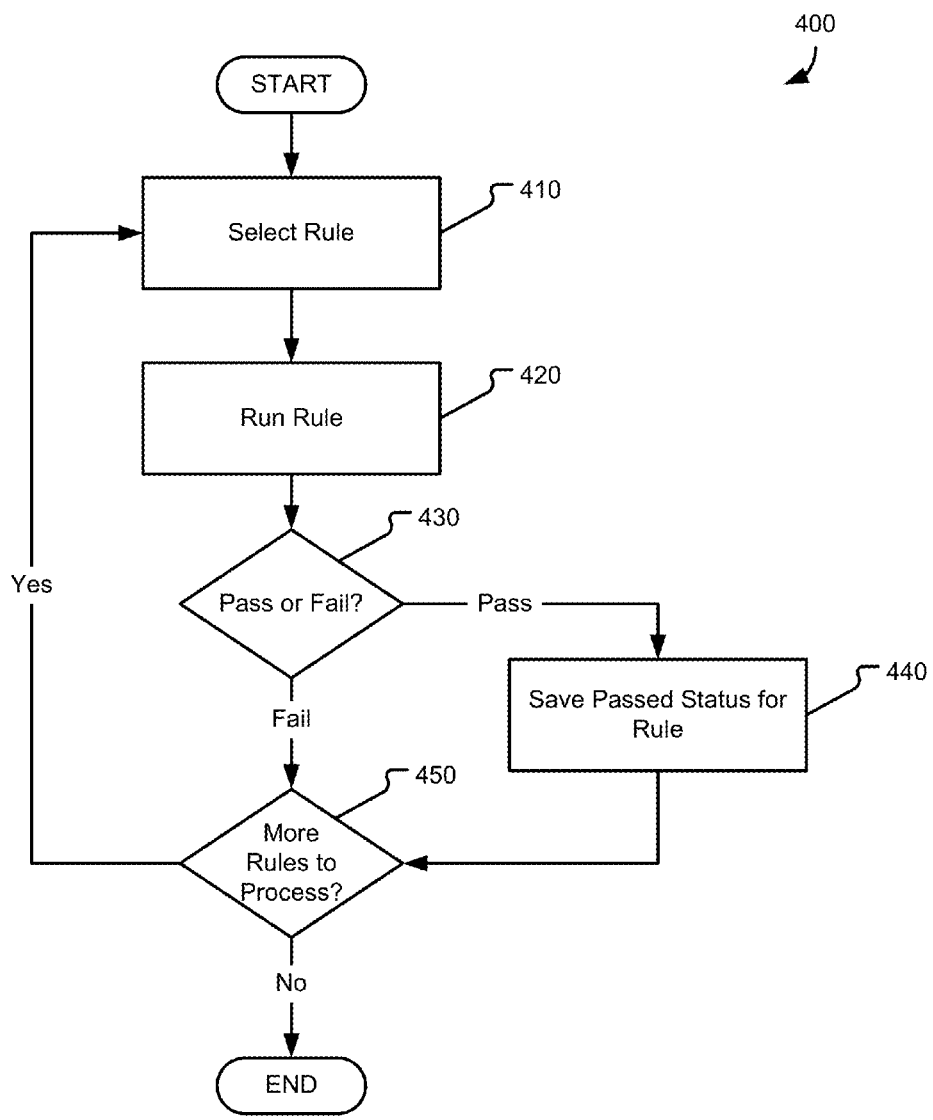
FIG. 4 is a flow chart showing general stages involved in an example method for running rules for determining a best match.

FIG. 4 is a flow chart showing general stages involved in an example method 400 for running rules according to determine a best match. Method 400 begins at OPERATION 410 where a rule is selected to be run. In some aspects, all rules are run by the document linking system 200 for all request documents 110 suspected of matching a given response document 120, while in other aspects, only those rules used in at least one of the configurations (or is used in generating a discrepancy mask 270) are run.

Once a rule is selected, it is run in OPERATION 420. The contents of data fields 170 from the response document 120 and each of the request documents 110 that are being run against the response document 120 according to the rules are compared to one another. In various aspects, the comparison uses a series of AND gates to determine whether the characters encoded in each data field 170 exactly match each other via a bitwise comparison of the two data fields 170. In other aspects, known abbreviations may be substituted (via bit shifting or OR gates) into the analysis (e.g., "Ave" for "Avenue", "Inc." for "Incorporated", "ABS" for "Antilock Brake System", "Matt" for "Matthew"), and supplemental information may be discarded from the analysis of a rule (e.g., middle initials or salutations from a name field, time of day from a date field, the plus-four codes to ZIP code from a postal code field). In yet other aspects, a series of OR gates will reduce each data field 170 to a single bit and the data fields 170 will be compared via an NXOR gate to return a bit indicating whether one of the structured documents has data for a field in which the other structured document has data.

At DECISION OPERATION 430, it is determined whether the data fields 170 have passed or failed the rule. Depending on the rule, an exact match or a presence indication between the two data fields 170 compared will be determined to be a passing result. In other aspects, an inexact match may be interpreted as a passing result based on a substitution or when supplemental data are discarded. In yet other aspects, a percentage match that exceeds a matching threshold may be determined to be a passing result. For example, when a first string of characters (e.g., "example") is compared to a second string of characters (e.g., "exampel" or "exampl") to determine if a sufficient number of characters match to count as passing the rule, so that typographical errors may be accounted for.

In other aspects of DECISION OPERATION 430, the contents of two data fields 170 may be subtracted from one other to yield a difference, which is used to determine whether the rule has been passed or failed. When the difference is zero, the rule will be considered to have passed, and data may be substituted or discarded as described above when determining the difference. When the data fields 170 to be compared are known to be numeric, a non-zero difference that is positive may be determined to be a passing result depending on whether the difference matches a second data field 170 (e.g., a delivery date field minus an order date field may match a days-in-transit field), and a negative field may be determine to be a failing result.

When the rule is determined to have been passed, method 400 proceeds to OPERATION 440, while if the rule is determined to have been failed, method 400 proceeds to DECISION OPERATION 450.

At OPERATION 440 the status of a rule of having been passed is saved for the request document 110 being compared to the response document 120. In various aspects, saving the status of the rule involves setting the state of a bit tracking the rule for a given data segment 130 or data field 170 from zero/FALSE to one/TRUE. The saved statuses and their use in determining a best match are discussed in greater detail in regard to FIG. 5. After the status of the rule has been saved, method 400 proceeds to DECISION OPERATION 450.

At DECISION OPERATION 450 it is determined whether there are any more rules to processes for the response document 120 and the request document 110. If there is another rule to process, method 400 returns to OPERATION 410 and that rule is run. If there is not another rule to process, method 400 concludes for the request document 110, and a new request document 110 may be selected to be run according to method 400. As will be appreciated, multiple rules may be run in series or in parallel through method 400 as may multiple request documents 110.

Figure 5:
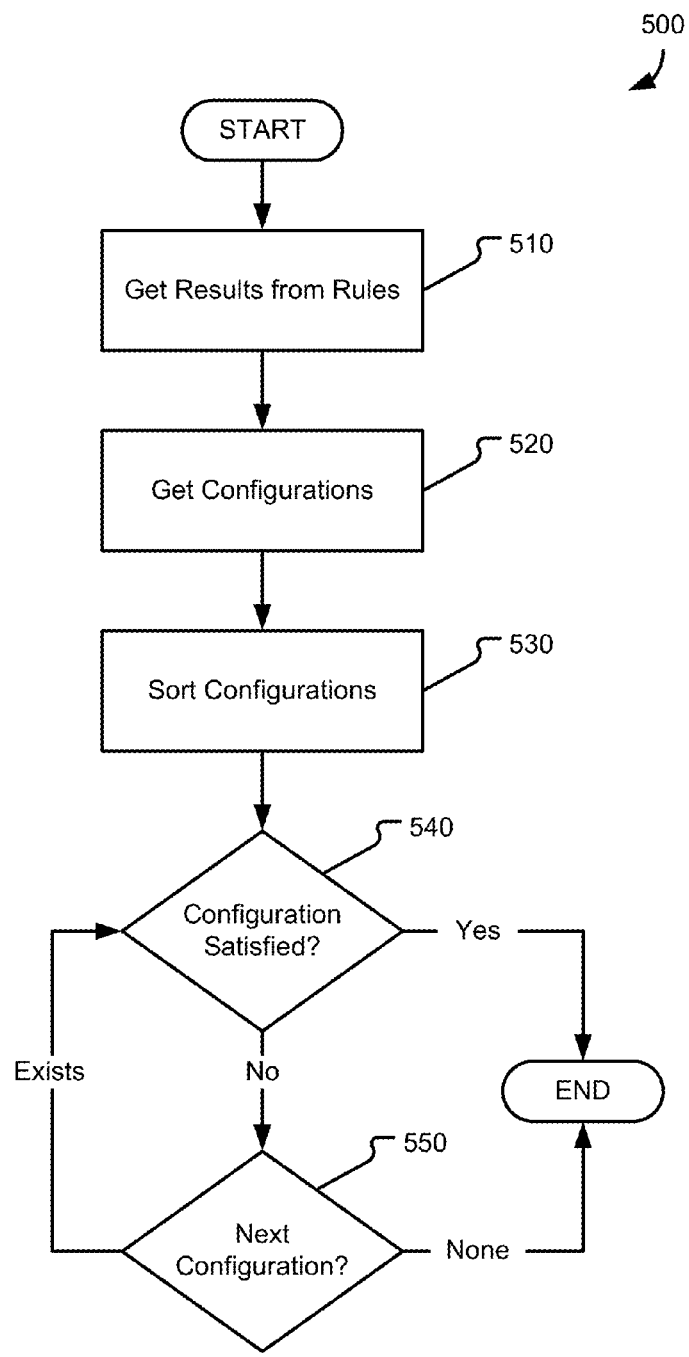
FIG. 5 is a flow chart showing general stages involved in an example method for determining via a configuration whether a request document is the best match for a given response document.

FIG. 5 is a flow chart showing general stages involved in an example method 500 for determining via a configuration whether a request document 110 is the best match for a given response document 120. Method 500 begins at OPERATION 510 when the results from the rules for a given request document 110 relative to the response document 120 are retrieved. Method 500 proceeds to OPERATION 520 where the configurations set by the originating party of the request document 110 are retrieved, and then OPERATION 530, where the order in which the request documents 110 will be analyzed by the configurations is set by sorting the configurations according the preferences set by the requesting party.

The requesting party sets the preferences by which it wishes its request documents 110 to be potentially matched to response documents 120. The configurations set which data segments 130 or data fields 170 will be compared, how those fields will be compared, what result will satisfy the configuration, and an order within a plurality of configurations that the configuration will be used to compare structured documents when the requesting party has set more than one configuration.

Method 500 proceeds to DECISION OPERATION 540, where it is determined whether any of the request documents 110 satisfy all the rules of a configuration when compared with the response document 120. In various aspects, whether the configuration is satisfied is determined by examining the statuses of bits for the selected data segments 130 or data fields 170 to be compared, and when all the status bits are set to one/TRUE, the configuration is considered to have been satisfied. When the configuration is satisfied, having all its rules in a passing state, the request documents 110 that meet the configuration will be considered the best matches for the response document 120 and method 500 will conclude. When the configuration is not satisfied, having at least one of its rules in a failing state, method 500 proceeds to DECISION OPERATION 550.

At DECISION OPERATION 550, it is determined whether a next configuration exists in the sequence of configurations. When a subsequent configuration exists, that configuration is selected, and method 500 returns to DECISION OPERATION 540, where that configuration is checked to the request documents 110. Method 500 will proceed in this loop, checking configurations in their set order until a best match is found or all configurations have been checked. When all of the configurations have been checked, and it is determined that no next configuration exists, method 500 concludes without returning a best matching request document 110 for the response document 120. In various aspects, the response document 120 may be flagged for matching at a later date.

Figure 6A:
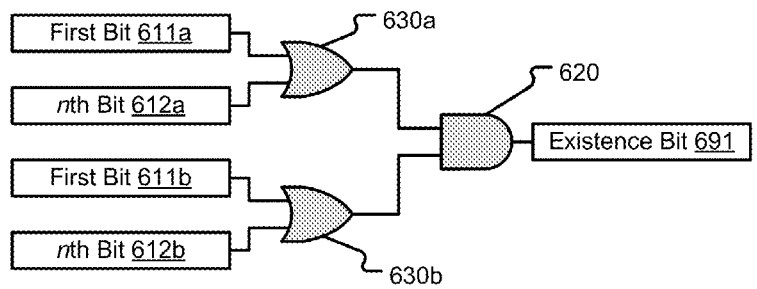
FIGS. 6A-C illustrate various example circuit-based implementations of rules.
Figure 6B:
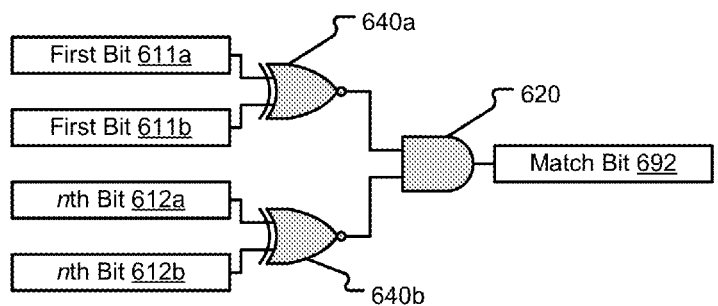
Figure 6C:
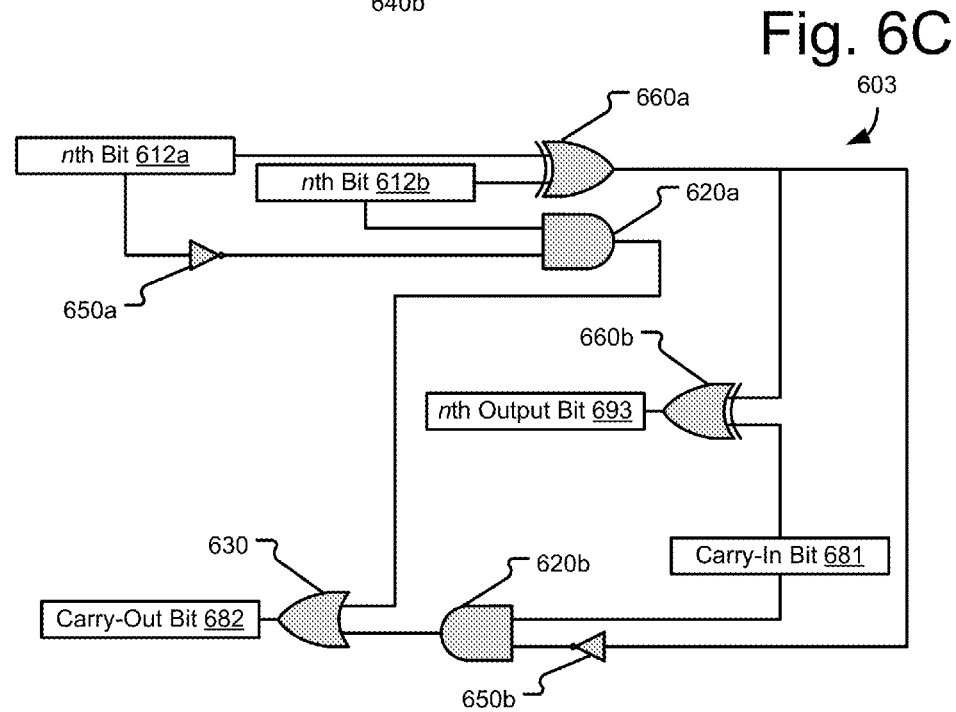

FIGS. 6A-C illustrate various example circuit-based implementations of rules to determine whether data fields 170 in structured documents are present in each structured document or match one another. Although examples are given in terms of individual data fields 170, one of ordinary skill in the art will understand that the examples may be applied to entire data segments 130, multiple data segments 130, or multiple data fields 170. Alternative arrangements of the logical components discussed herein will also be recognized, and may be used without departing from the scope of the present disclosure. As will also be understood, the circuit diagrams discussed in relation for FIGS. 6A-C may be implemented via individual transistors that are discrete components or part of a processor that is configured to provide the corresponding logical operations.

As illustrated in FIGS. 6A-C, bits from a first structured document are labeled with an "a" and bits from a second structured document are labeled with a "b" so that their source may be readily apparent. First bits 611 and nth bits 612 correspond to different bits on which is encoded data comprising the fields being compared between the first and second structured documents, such that first bit 611*a* and nth bit 612*a* are from the first document, and first bit 611*b* and nth bit 612*b* are from the second document. In various aspects, the first document may be either a request document 110 or a response document 120, and the second document will be the other.

Because the maximum size of data fields 170 will be known for structured documents, the circuits will be sized to accommodate the largest possible data field 170 from up to two structured documents. For example, when a data field 170 contains a maximum of twelve characters, each character being encoded in one byte (e.g., according to ASCII or a basic Latin set from the UTF-8 standard), the logic gate array will accept up to 192 inputs (i.e., 12*8*2 inputs).

When the data within a data field 170 does not fully fill that data field 170, such as when only twelve characters are encoded in a field with a maximum size of thirteen characters, any unused bits may be set to zero/FALSE or no input to the corresponding leads of a given logic gate array will be provided.

An arrayed logic gate will accept multiple inputs to produce a single output per the rules of the logic gate. For example, an AND logic gate array 620 will accept n inputs and produce one output, wherein than one output will return zero/FALSE unless all of the n inputs are one/TRUE, in which case it will return one/TRUE. In another example, an OR logic gate array 630 will accept n inputs and will produce one output, wherein that one output will return one/TRUE if any of the n inputs is one/TRUE, otherwise the logic gate array will return zero/FALSE. One of ordinary skill in the art will be familiar with the truth tables of different logic gate arrays.

As will be appreciated, a rule may make multiple uses of one or more of the example circuits to provide greater nuance in comparisons between structured documents. For example, a rule to compare whether a given line item is present in both structured documents may run a match for a segment identifier 140, a match for a data field 170 holding a description of that line item, and a subtraction of a data field 170 holding cost information. The multiple outputs from these circuits may be combined via AND or OR operations to return a passing state or a failing state of the rule. Alternatively, when only one circuit is used, its output's state may be used to return a passing or failing state of the rule.

FIG. 6A is an example diagram of an existence circuit 601 corresponding to a rule for comparing whether a data field 170 exists in both structured documents. As illustrated, each of the bits of a data field 170 from a given structured document are input into an OR logic gate array 630. First bit 611*a* through nth bit 612*a* from the first structured document are fed into a first OR logic gate array 630*a*, and first bit 611*b* through nth bit 612*b* from the second structured document are fed into a second OR logic gate array 630*b*. The output of the first OR logic gate array 630*a* is then combined with the output of the second OR logic gate array 630*b* via an AND logic gate array 620 to produce an existence bit 691 to indicate that both data fields 170 contain data with a one/TRUE value or that only one, or neither data field 170 contains data with a zero/FALSE value.

As will be understood, reversing the order in which the documents are input into an existence circuit 601 will result in a changed perspective (i.e., document one lacks a field present in document two versus document one has a field that document two lacks), but the same output. For example when the rule is run for a data field 170 found in the first document that is not in the second document (or vice versa), the output will indicate that the first document has an additional field that the second structured document lacks.

FIG. 6B is an example diagram for a matching circuit 602 corresponding to a rule for comparing whether a data field 170 in a first structured document matches a data field 170 in a second structured document. Each bit from a structured document is combined with the corresponding bit from the other structured document via an XNOR logic gate array 640. For example, a first bit 611*a* from a first structured document will be XNORed with a first bit 611*b* from a second structured document via a first XNOR logic gate array 640*a*, and an nth bit 612*a* from a first structured document will be XNORed with an nth bit 612*b* from a second structured document via an nth XNOR logic gate array 640*b*. The output of the first XNOR logic gate array 640*a* is then combined with the output of the nth XNOR logic gate array 640*b* via an AND logic gate array 620 to produce a match bit 692 to indicate that both data fields 170 contain data that match each other with a one/TRUE value or that the data fields 170 do not match with a zero/FALSE value.

As discussed previously in relation to FIG. 4, a configuration may allow for inexact matches as well as exact matches. Therefore, the input bits from one or more of the structured documents may be substituted or discarded from that document via bit shifting or ignoring portions of the data fields 170 to be compared. For example, for a data field 170 for a personal name, a first document may have "DOE JOHN", whereas a second document may have "DOE JOHN Q", and the bits used to encode the extra "Q" not found in the first document may be ignored so that the two structured documents may be considered to be matching. Similarly, if a different document held the name value "DOE JONATHAN", the term "JOHNATHAN" could be recognized by a separate matching circuit 602 so that the term "JOHN" may be substituted for "JOHNATHAN" when comparing the two documents so that an inexact match will return one/TRUE. The separate circuits for exact and inexact matches may be combine via an OR gate to provide a single output for a configuration.

FIG. 6C is an example diagram for a bitwise subtractor circuit 603 corresponding to a rule for finding the difference between two data fields 170. In various aspects, before subtracting one data field 170 from another, the values of those data fields 170 are converted from character representations of digits of that number (e.g., in the UTF-8 or ASCII formats) to a binary representation of that number. For example, the number twelve in UTF-8 format is represented as two characters (i.e., "1" and "2"), each with its own encoding for the digit it represents (0011 $0001_{x2}$ and 0011 $0010_{x2}$, respectively), whereas the number twelve in binary notation is represented as 0000 $1100_{x2}$. As will be understood, there are multiple ways to represent a number in a binary format that accounts for negative and fractional numbers, and the precise format may vary in different aspects so long as the number is represented as a whole and not via individual representations of the digits.

As will be recognized, bitwise subtraction operations include as inputs bits for a minuend, a subtrahend, and a carry-in, and include as outputs bits for a difference and a carry-out. The minuend is the input from which the subtrahend is subtracted, which are illustrated as the nth bit 612*a* from the first document and the nth bit 612*b* from the second document respectively.

A carry-in bit 681 represents "carry-over" from a previous bitwise subtraction operation (e.g., from the (n−1)th bits from the two documents) and a carry-out bit 682 represents "carry-over" from the current operation to the next bitwise subtraction operation (e.g., for the (n+1)th bits from the two documents). The carry-in bit 681 for the first bits subtracted will be zero/FALSE, but for any subsequent bits will be equal to the carry-out bit 682 from the previous bits' operation. Thus, for subtraction of numbers represented n bits, n or more bitwise subtractor circuits 603 are chained together by their carry-in bits 681 and carry-out bits 682, and the chain begins with the least significant bits representing the two structured documents' numbers.

In the example diagram, the value of the carry-out bit 682 is determined via an OR logic gate array 630, which takes its inputs from the outputs of a first AND logic gate array 620*a* and a second AND logic gate array 620*b*. The first AND logic gate array 620a uses the subtrahend and an inversion of the minuend's value, via first inverter 650a, as inputs for an AND operation. The second AND logic gate array 620b uses the carry-in bit 681 and an inversion, via second inverter 650b, of a XORing, via first XOR logic gate array 660a, of the minuend and the subtrahend as inputs for an AND operation.

In the example diagram, the minuend is XORed with the subtrahend via the first XOR logic gate array 660a, which is in turn XORed with the carry-in bit 681 via the second XOR logic gate array 660b to produce the nth output bit 693. The carry-in bit 681 is equal to the carry-out bit 682 for the previous subtraction operation. Each operation of the bitwise subtractor circuit 603 results in one output bit 693, and the output bits 693 are assembled into the difference between the numbers from the two structured documents in order from least significant bit to most significant bit. For example, for the operation of four ($0100_{x2}$) minus two ($0010_{x2}$), the first output bit 693 would be zero/FALSE and the second output bit 693 would be one/TRUE to yield the difference of two ($0010_{x2}$) with zero/FALSE in the least significant position and one/TRUE in the next most significant position based on the order of output from the example bitwise subtractor circuit 603.

A configuration will select, based on the requesting party's preferences, which data segments 130 or data fields 170 will be selected as inputs for a given rule and which rule circuits, and combinations thereof, are selected to compare the structured documents per the requesting party's preferences. For example, a request document 110 may be compared to a definition via an existence circuit 101 to determine whether it includes an end date as defined by the definition, and if an end date is not included, a start date or a date of request from the request document 110 will be substituted for the end date, which will then be compared via a matching circuit 602 to the dates present in the response document 120. Continuing the example, if the dates match, the configured rule will be considered to have passed, while if the dates do not match, a subtractor circuit 603 will be used to determine the minimum and maximum date values in each of the structured documents, and those date values will then be compared via a matching circuit 602, which will determine whether the configured rule will pass or fail according to whether the date values match.

As will be understood, a configuration may chain several rule circuits together, and the example rule circuits given herein are non-limiting examples of potential rules circuits that may be used to affect rules for use in a configuration. Other example configured rules include, but are not limited to: does a party requested field in the request document 110 match a responding party field in the response document 120; do total charges match between both documents; do all detailed requests (e.g., line items charges, product codes, amounts or dates of requests) from the request document 110 exist in both documents; do all detailed requests (e.g., line items) from the response document 120 exist in both documents; do all detailed charges match between documents; are the dates or timestamps in the response document 120 greater than those present in the request document 110; do requesting party address information match between documents; does the request document 110 include frequency information (e.g., encounter, invoice, or tracking numbers); do the frequency information match between both documents; etc.

Figure 7:
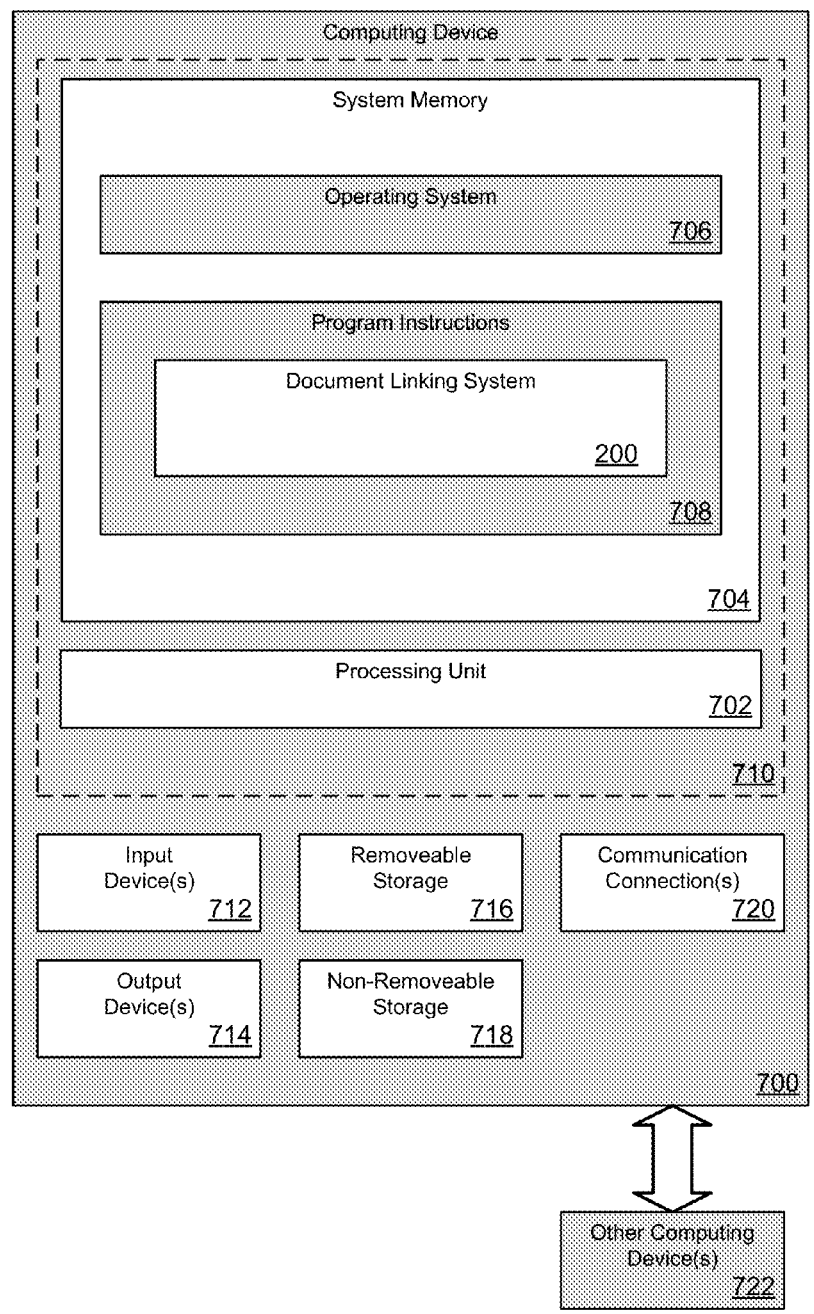
FIG. 7 is a block diagram illustrating physical components of an example computing device with which aspects may be practiced.

FIG. 7 is a block diagram illustrating physical components of an example computing device 700 with which aspects may be practiced. The computing device 700 may include at least one processing unit 702 and a system memory 704. The system memory 704 may comprise, but is not limited to, volatile (e.g. random access memory (RAM)), non-volatile (e.g. read-only memory (ROM)), flash memory, or any combination thereof. System memory 704 may include operating system 706, one or more program instructions 708, and may include a document linking system 200 having sufficient computer-executable instructions, which when executed, perform functionalities as described herein. Operating system 706, for example, may be suitable for controlling the operation of computing device 700. Furthermore, aspects may be practiced in conjunction with a graphics library, other operating systems, or any other application program and is not limited to any particular application or system. This basic configuration is illustrated by those components within a dashed line 710. Computing device 700 may also include one or more input device(s) 712 (keyboard, mouse, pen, touch input device, etc.) and one or more output device(s) 714 (e.g., display, speakers, a printer, etc.).

The computing device 700 may also include additional data storage devices (removable or non-removable) such as, for example, magnetic disks, optical disks, or tape. Such additional storage is illustrated by a removable storage 716 and a non-removable storage 718. Computing device 700 may also contain a communication connection 720 that may allow computing device 700 to communicate with other computing devices 722, such as over a network in a distributed computing environment, for example, an intranet or the Internet. Communication connection 720 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 700 or any other computing devices 722, in combination with computing device 700, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system with improved accuracy for linking structured electronic documents, comprising:
a processor and a memory storage device including instructions, which when executed by the processor enable the system to:
receive a response document from a responding party;
assign a unique document identifier to the response document;
search for request documents from a plurality of request documents that share a subject identifier with the response document;
when no request documents are found that share the subject identifier with the response document, search for request documents from the plurality of request documents that share party identifiers with the response document;
when at least one request document is found, compare each request document found to the response document according to a configuration, wherein the configuration selects rules specifying data segments to compare between each request document found and the response document;
when one request document of the at least one request document found satisfies the configuration,
set the one request document as a best matching request document;
generate a discrepancy mask, wherein the discrepancy mask indicates the data segments in the best matching request document that have been responded to by the response document according to the configuration;
link the unique document identifier of the response document with the best matching request document in a link database; and
convert the best matching request document into a secondary request document by removing the data segments in the discrepancy mask from the best matching request document; and
transmit the secondary request document to a third party.

2. The system of claim 1, wherein the instructions further enable the system to:
select a subsequent configuration from a plurality of configurations when none of the at least one request document found satisfies the configuration; and
compare each request document found to the response document according to the subsequent configuration.

3. The system of claim 2, wherein the instructions further enable the system to:
flag the response document for follow up in the link database when none of the at least one request document found satisfies any configuration of the plurality of configurations.

4. The system of claim 1, wherein the instructions further enable the system to:
provide a hyperlink to view the best matching request document when the response document is viewed in a document viewing application.

5. The system of claim 1, wherein the instructions further enable the system to:
provide a hyperlink to view the response document when the best matching request document is viewed in a document viewing application.

6. A method with improved accuracy for linking structured electronic documents, comprising:
receiving a response document;
assigning a unique document identifier to the response document;

searching for request documents from a plurality of request documents that share an identifier with the response document;

when no request documents are found that share the identifier with the response document, searching for request documents from the plurality of request documents that share party identifiers with the response document;

when at least one request document is found, comparing each request document found to the response document according to a configuration, wherein the configuration selects rules specifying data segments to compare between each request document found and the response document;

when one request document of the at least one request document satisfies the configuration, setting the one request document as a best matching request document, generating a discrepancy mask, wherein the discrepancy mask indicates the data segments in the best matching request document that have been responded to by the response document according to the configuration, linking the unique document identifier of the response document with the best matching request document in a link database, and converting the best matching request document into a secondary request document by removing the data segments in the discrepancy mask from the best matching request document; and transmitting the secondary request document to a third party.

7. The method of claim 6, wherein searching for the request documents from the plurality of request documents that share the identifier with the response document further comprises:

comparing a subject identifier included in the response document to each of the request documents of the plurality of request documents to determine whether the subject identifier is shared;

when the subject identifier is shared between the response document and one or more of the request documents of the plurality of request documents, returning those response documents as found;

when the subject identifier is not shared between the response document any request document of the plurality of request documents, comparing a party identifier included in the response document to each of the request documents of the plurality of request documents to determine whether the party identifier is shared; and when the party identifier is shared between the response document and one or more of the request documents of the plurality of request documents, returning those response documents as found.

8. The method of claim 6, wherein when more than one request document satisfies the configuration, comparing each request document satisfying the configuration to the response document according to a subsequent configuration of a plurality of configurations.

9. The method of claim 6, further comprising:

determining whether the response document answers all requests included in the best matching request document; and when it is determined that the response document does not answer all the requests included in the best matching request document:

generating the secondary request document, wherein the secondary request document includes requests not answered by the response document and does not include requests answered by the response document; and transmitting the secondary request document to a third party.

10. The method of claim 9, wherein determining whether the response document answers all requests included in the best matching request document comprises:

determining which of the data segments, not specified by the configuration, match between the response document and the best matching request document;

removing from the best matching request document the data segments determined to match between the response document and the best matching request document to generate the secondary request document.

11. The method of claim 9, wherein determining whether the response document answers all requests included in the best matching request document comprises:

determining which data segments do not match between the response document and the best matching request document;

wherein generating the secondary request document further comprises constructing the secondary request document from the data segments of the best matching request document related to the third party and the data segments determined to not match between the response document and the best matching request document.

12. The method of claim 10, further comprising:

assigning a new unique document identifier to the secondary request document; and linking the new unique document identifier of the secondary request document with the best matching request document and the response document in the link database.

13. The method of claim 6, wherein the rules are implemented by:

a matching circuit;
an existence circuit; and
a subtraction circuit.

14. The method of claim 6, wherein linking the unique document identifier of the response document with the best matching request document in the link database comprises storing unique document identifiers associated with each structured electronic document to enable a document viewing application to provide hyperlinks to other structured electronic documents that comprise a chain of communication to which a currently viewed structured electronic document belongs.

15. The method of claim 6, wherein the structured electronic documents are formatted according to an Accredited Standards Committee X12 format.

16. A system with improved accuracy for linking structured electronic documents, comprising:

a processor; and a memory storage device including instructions, which when executed by the processor cause the system to provide:

a rule database, operable to provide a plurality of rules by which a plurality of request documents and a response document are compared, wherein request documents and response documents are structured electronic documents comprising data segments;

a rule configurer, operable to organize selected rules by which each request document of the plurality of request documents is compared to the response document to create a configuration, wherein the rules are selected according to preferences of a party that created the request document;
a response matcher, operable to receive the response document from a responding party and compare the response document to the plurality of request documents according to the configuration to determine a best matching request document to the response document, wherein the response matcher compares selected data segments of the response document to equivalent data segments in each of the plurality of request documents to determine the best matching request document according to the configuration and to produce a discrepancy mask;
a link database, operable to store and link unique document identifiers for the best matching request document and the response document; and
a secondary request generator operable to generate and transmit a secondary request document to a third party, wherein the secondary request document is generated by comparing the best matching request document to the discrepancy mask to remove data segments from the best matching request document that the response document satisfied according to the configuration to convert the best matching request document into the secondary request document.

17. The system of claim 16, wherein the configuration is a first configuration in an ordered plurality of configurations; and wherein the response matcher is further operable to compare the response document to the plurality of request documents according to a subsequent configuration from the ordered plurality of configurations to determine the best matching request document to the response document when none of the plurality of request documents is determined to be the best matching request document according to the first configuration.

18. The system of claim 16, wherein the link database stores the unique document identifiers to enable a document viewing application to provide hyperlinks to related structured electronic documents that comprise a chain of communication to which a currently viewed structured electronic document belongs.

19. The system of claim 16, wherein the secondary request document is stored by the system and the secondary request generator links the secondary request document to the best matching request document and the response document in the link database.

20. The system of claim 16, wherein the structured electronic documents are stored in a request repository.

* * * * *